July 4, 1961  A. M. SOUDER  2,990,719
CONTROL APPARATUS

Filed Nov. 5, 1959  2 Sheets-Sheet 1

INVENTOR
ALAN M. SOUDER
BY Roger W. Jensen
ATTORNEY

July 4, 1961
A. M. SOUDER
2,990,719
CONTROL APPARATUS
Filed Nov. 5, 1959
2 Sheets-Sheet 2
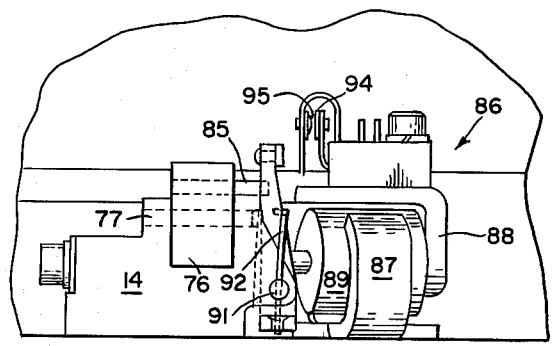
FIG. 3
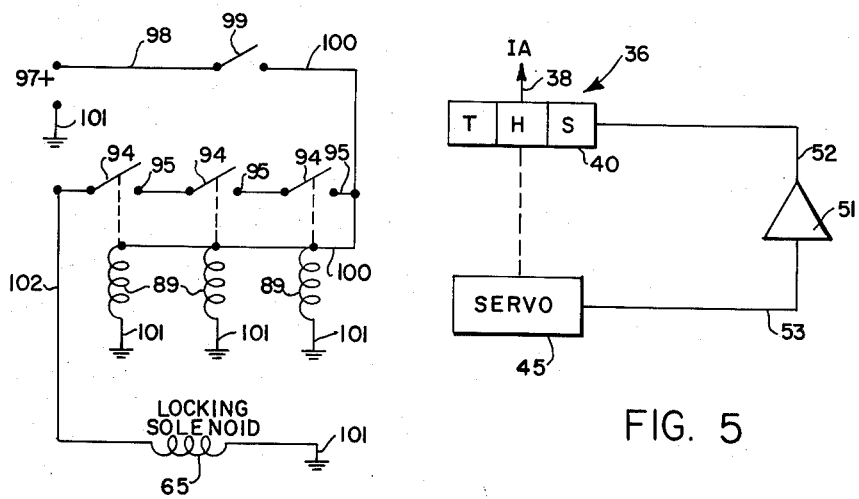
FIG. 4
FIG. 5
INVENTOR
ALAN M. SOUDER
BY Roger W. Jensen
ATTORNEY

United States Patent Office 2,990,719
Patented July 4, 1961

2,990,719
CONTROL APPARATUS
Alan M. Souder, Largo, Fla., assignor to Minneapolis-Honeywell Regulator Company, Minneapolis, Minn., a corporation of Delaware
Filed Nov. 5, 1959, Ser. No. 851,128
8 Claims. (Cl. 74—5.1)

The present invention pertains generally to control apparatus and more specifically to the field of single axis platforms. Generally a single axis platform comprises a base or housing upon which is rotatably mounted a platform or turntable for rotation about a turntable axis. Mounted on the platform is a gyroscope having input and output axes, the input axis being arranged substantially parallel to the platform axis. The gyroscope has means for measuring rotation of the gyroscope about the output axis. Servomotor means are provided between the platform and the housing and are adapted to cause relative rotation between the platform and the housing upon actuation thereof. Means are provided for energizing the servomotor means as a function of the signal from the gyro signal producing means. Second signal producing means are provided for measuring relative rotation between the platform and the housing.

In operation any movement of the platform about the gyro input axis caused by rotation of the entire base or housing member about said gyro input axis will be detected by the gyro causing a precession about the output axis. The precession about the output axis is detected by the gyro signal producing means which in turn will cause actuation of the servo means so as to rotate the platform relative to the base, the sense of rotation being to return the platform back to its initial position in space prior to the disturbance which rotated the base.

It is very important in single axis platforms of the type described to maintain the platform's position relative to the base constant except when the servomotor is receiving energization. In some prior art single axis platforms, there have been problems related to the turntable being rotated by extraneous forces relative to the base in the absence of signals to the servomotor. Since the position of the turntable relative to the base is the only measure of the platform output, it follows that undesired rotation will introduce errors into the system.

The present invention provides a means for positively locking the platform or turntable of a single axis platform against rotation relative to the base upon remote electrical command regardless of whether the servo loop is energized or not. The present invention also provides a means for disabling the locking means so as to prevent an undesired vibration or acceleration induced premature locking.

It is an object of this invention therefore to provide an improved control apparatus.

Another object of the invention is to provide an improved single axis platform.

Still another object of the invention is to provide a means for locking a single axis platform relative to its base against rotation in any one of an infinite number of angular positions except when rotation is desired.

Another object of the invention is to provide a means for disabling the locking means of the previous object so as to prevent a premature or inadvertent locking of the platform.

These and other objects of the invention will become more apparent from a reading of the following specification and appended claims in conjunction with the drawings in which:

FIGURE 3 is a view of one of the disabling means in the platform braking apparatus;

FIGURE 4 is a schematic wiring diagram showing the connections to the three disabling relays and to the locking solenoid; and FIGURE 5 is a block diagram showing the interconnections between the gyroscope and the servomotor which drives the platform.

Figure 1:
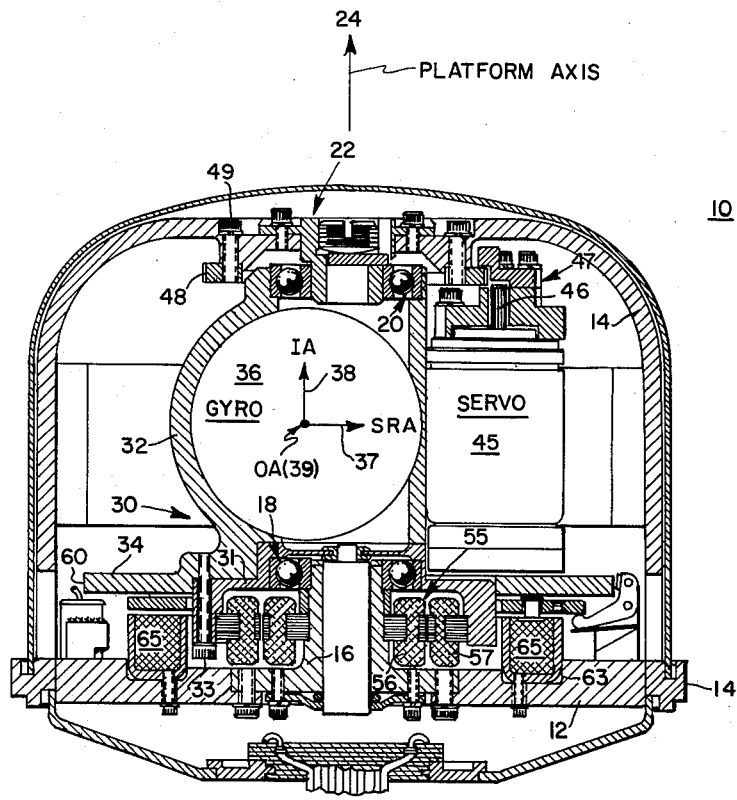
FIGURE 1 is a cross-sectional view of a single axis platform embodying the teaching of the invention.

Referring to FIGURE 1, the reference numeral 10 generally designates a single axis platform comprising in part a main base portion 12 having a general flat circular configuration which in turn is fitted into an auxiliary base member 14 having a general cuplike configuration. The base member 12 has a central aperture into which is fitted and secured a hub member 16 the upper end of which as shown in FIGURE 1 is fitted into the inner race of a main turntable bearing 18. A second main turntable bearing 20 is mounted coaxially with the first bearing 18 and is retained by a suitable holding means 22 centrally positioned in the closed end of cuplike auxiliary frame member 14.

The two main turntable bearings 18 and 20 thus define a platform axis 24. The platform or table member is generally identified by reference numeral 30 and includes a cuplike member 31 adapted to receive the outer race of the first main platform bearing 18. The turntable assembly further includes a gyro mounting portion 32 which is connected to the cuplike element 31 by suitable means such as bolt elements 33. The gyro mount 32 further includes a flange portion 34. The upper portion of the gyro mount 32 as shown in FIGURE 1 is adapted to receive the outer race of the second main platform bearing 20.

A gyro generally identified by the reference numeral 36 is adapted to be placed within the gyro mount 32 and is shown only schematically as having a spin reference axis 37, an input axis 38, and an output axis 39. Any suitable gyroscope may be used, one for example being the type shown in the patent to J. J. Jarosh et al. 2,752,-791. As shown schematically in FIGURE 5 the gyro includes a signal generating means 40 for producing a signal indicative of rotation of the gyro about its output axis 39.

Mounted on the turntable or platform 30 is a servomotor 45 having an output pinion gear 46 which is adapted to engage a pinion gear of a gear train assembly generally identified by the reference numeral 47. The pinion gear engaged by the gear element 46 is not shown in FIGURE 1. The output of the gear train assembly 47 is coupled to a ring gear 48 connected to the auxiliary frame or base portion 14 by suitable means such as bolt elements 49.

Referring to FIGURE 5, the signal generating means 40 of the gyroscope 36 is adapted to be connected by suitable means including an amplifier 51 and a pair of leads 52 and 53 to the servomotor 45. The servomotor, when actuated, will cause relative rotation to occur between the platform 30 and the base 12, the rotation taking place about the platform axis 24. This also causes rotation of the gyro about the gyro input axis 38 which is schematically represented in FIGURE 5. In operation, the entire single axis platform 10 will function to stabilize the turntable assembly 30 in space about its axis 24. Any rotation of the entire base 12—14 about the axis 24 will be sensed by the gyroscope 36, this rotation being about the gyro input axis 38 also. The rotation about the gyro input axis 38 causes the precession of the gyroscope about the gyro output axis 39 which is, as shown, perpendicular to both the input axis 38 and the spin reference axis 37.

The gyroscopic precession is measured by the signal generating means 40 which produces a signal indicative of movement of the gyro about the output axis 39. The signal is applied through the amplifier 51 and leads 52 and 53 so as to energize the servomotor 45, the sense of energization to the servomotor 45 being such that the turntable assembly 30 will be rotated in a direction opposite to the initial rotational input. The rotation of the turntable will cause the gyro to precess toward its initial or null signal producing position.

The single axis platform 10 is provided with means for measuring the relative rotation between the base 12 and the rotating assembly 30. The means may take a variety of forms and as shown is a pancake type synchro pickoff generally identified by the reference numeral 55 including a first member 56 connected to the hub element 16 and a second element 57 secured within the cuplike element 31 of the turntable assembly 30. Suitable means, not shown, are provided for energizing one of the elements of the synchro pickoff 55 and for connecting the other element to remote control means, not shown, which would be controlled as a function of the relative rotation between the base 12 and the turntable assembly 30.

Figure 2:
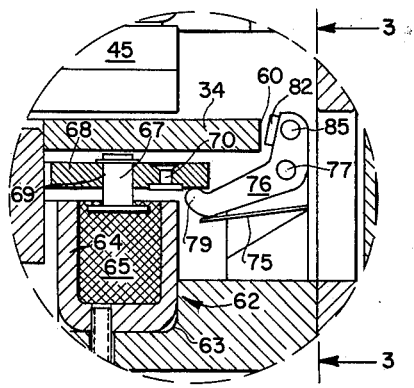
FIGURE 2 is an enlarged view of part of the structure shown in FIGURE 1.

The turntable assembly 30 as described above is free to rotate about its axis 24 upon actuation of the servomotor 45. Means are provided for positively locking the turntable or platform 30 against rotation relative to the base 12 in any one of an almost infinite number of random angular positions, the locking being sufficient to prevent rotation of the turntable even if the servomotor 45 receives energy sufficient to generate full servo torque. The braking means includes the peripheral surface 60 of the flange 34 of the gyro mount 32. The braking means also includes a solenoid assembly generally identified by reference numeral 62 and comprising an annularly shaped coil and core assembly mounted in a suitable recess 63 in the base 12, the core being identified by reference numeral 64 and the coil by reference numeral 65. As shown in FIGURES 1 and 2 the core element 64 has a U-shaped cross section. A plurality of guide pins 67 are securely mounted on the coil 65 and project axially away from the coil and serve as a means for slideably positioning an armature plate 68 which has a general annular configuration with suitable apertures 69 for receiving the pins 67. Antistick means in the form of non-magnetic spacers 70 are provided in the armature 68 to prevent the armature 68 from being held in engagement with the core 64 by residual magnetism. The armature 68 is shown in the normal position corresponding to the coil 65 being deenergized. The armature 68 is mechanically biased to this position through the action of a plurality of leaf springs 75 which respectively bias a plurality of lever elements 76 (only one of which is shown in the drawings). Each lever 76 is pivotally mounted as at 77 on the auxiliary base member 14. Each lever has an extremity 79 adapted to engage the lower surface of the armature 68. As shown in FIGURE 2, the spring 75 biases the lever 76 clockwise around the pivotal axis 77 causing the extremity 79 to abut against the lower face of the armature 68 thus holding the armature 68 away from the core 64 and coil 65 of the solenoid 62.

At the other extremity of the levers 76 is a brake facing 82 adapted to engage the peripheral surface 60 of the flange 34 when the lever arms 76 are rotated counterclockwise (as shown in FIGURE 2) about their pivotal axis 77. This counterclockwise rotation is accomplished by the solenoid winding 65 being energized which pulls the armature plate 68 downwardly as shown in FIGURE 2 overcoming the spring biasing effect of springs 75. It will be understood that there are a plurality of the levers 76. For the specific device shown three of the lever assemblies are provided being arranged 120° apart from one another about the platform axis and hence only one of the assemblies is shown in the drawing.

A pin element 85 is mounted on the levers 76 at the extremity thereof adjacent to the brake facing 82. Referring to FIGURE 3, the lever 76 is shown as mounted on the auxiliary frame 14. Also disclosed in this view is a brake disabling means generally identified by the reference numeral 86 and including a frame element 87 which supports a relay including a U-shaped core 88 upon which is mounted a coil 89. An armature assembly for the relay is identified by reference numeral 90 which is adapted to rotate about a pivotal axis 91. The armature 90 is biased by a spring 92 to a counterclockwise position as shown in FIGURE 3 and is adapted to be rotated clockwise from said position upon energization of the coil 89. In the position shown in FIGURE 3 there is an interference between the armature 90 and the pin 85 attached to the lever 76. The function of this is to prevent counterclockwise rotation of the lever 76 until the disabling means including the coil 89 is energized and the armature 90 has been rotated to its hold-in position or clockwise position as shown in FIGURE 3. The disabling relay also includes a pair of normally open contacts 94 and 95 which are closed when the armature 90 is pulled in or rotated clockwise as shown in FIGURE 3.

The overall function of the locking or braking disabling means is to prevent inadvertent or premature locking of the turntable. Excessive accelerations of the device 10 along the platform axis 24 conceivably could cause the armature 68 to be displaced toward the coil core assembly 64—65 so as to rotate the levers 76 into engagement with the peripheral surface 60 of the flange 34 of the turntable. As long as the coils 89 are deenergized so that the armatures 90 are in their deenergized position, being biased thereto by the springs 92, the levers 76 are prevented from being rotated into the braking position.

In FIGURE 4 the schematic diagram for the locking solenoid and the locking disabling means is shown. The reference numeral 89 has been used to designate each of three coils, it being understood that a disabling relay is provided adjacent to each lever 76. Likewise, reference numerals 94 and 95 are used to designate the normally open contacts of each of the three disabling relays. A source of suitable electric power 97 is provided and is adapted to be connected to the coils 89 through a lead 98, a suitable switch member 99, and another lead 100, the coils 89 all being connected at one end to the lead 100 and connected at their other extremity to ground as at 101. When the switch 99 is closed, the coils 89 of the disabling relays are energized causing the armatures 90 to be displaced to their energized position so as to close the normally open contacts 94 and 95. It will be noted in FIGURE 4 that the normally open contacts 94 and 95 of each of the disabling relays are connected in series with one another between the lead 100 and another lead 102 which is connected to one side of the locking solenoid 65, the other side of which is grounded as at 101. Since all of the contacts 94 and 95 are in series it follows that all of the disabling relays must be fully actuated in order to permit the energization of the coil 65.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim is:

1. In a single axis platform: a base member; a platform rotatably mounted on said base member for rotation about an axis; a gyroscope having input and output axes mounted on said platform with said input axis substantially parallel with said platform axis; means on said gyroscope for producing a signal indicative of rotation of said gyroscope about said output axis; motor means connected between said base member and said platform; means connecting said motor means to said signal producing means, said motor means being adapted when actuated to rotate said platform relative to said base member; a lever member pivotally mounted on said base member and normally biased to a first position; solenoid means mounted on said base member and including an armature displaceable from a first position to a second position upon energization of said solenoid means, said armature having a portion adapted to engage one end of said lever member and said lever member being adapted to be displaced from said first lever position to a second position by said armature being displaced to said second armature position; means on said lever member adapted to engage said platform upon said lever member being displaced to its second position; means for locking said lever member in said first lever position; and means for disabling said locking means.

2. In a single axis platform: a base member; a platform rotatably mounted on said base member for rotation about an axis; a gyroscope having input and output axes mounted on said platform with said input axis substantially parallel with said platform axis; means on said gyroscope for producing a signal indicative of rotation of said gyroscope about said output axis; motor means connected between said base member and said platform; means connecting said motor means to said signal producing means, said motor means being adapted when actuated to rotate said platform relative to said base member; a plurality of lever members pivotally mounted on said base member and normally biased to a first position; second motor means mounted on said base member and including a motor element displaceable from a first position to a second position upon energization of said second motor means, said motor element being adapted to engage one end of each of said lever members and said lever members being adapted to be displaced from said first lever position to a second position by said motor element being displaced to said second motor element position; and means on said lever members adapted to engage said platform upon said lever members being displaced to their second position.

3. In a single axis platform: a base member; a platform rotatably mounted on said base member for rotation about an axis; a gyroscope having input and output axes mounted on said platform with said input axis substantially parallel with said platform axis; means on said gyroscope for producing a signal indicative of rotation of said gyroscope about said output axis; motor means connected between said base member and said platform; means connecting said motor means to said signal producing means, said motor means being adapted when actuated to rotate said platform relative to said base member; a brake member movably mounted on said base member and normally biased to a first position; second motor means mounted on said base member and including a motor element displaceable from a first position to a second position upon energization of said second motor means, said motor element being adapted to engage said brake member and said brake member being adapted to be displaced from said first brake position to a second brake position by said motor element being displaced to said second motor element position; and means on said brake member adapted to engage said platform upon said brake member being displaced to its second position.

4. In a single axis platform: a base member; a platform rotatably mounted on said base member for rotation about an axis; a gyroscope having input and output axes mounted on said platform with said input axis substantially parallel with said platform axis; means on said gyroscope for producing a signal indicative of rotation of said gyroscope about said output axis; motor means connected between said base member and said platform; means connecting said motor means to said signal producing means, said motor means being adapted when actuated to rotate said platform relative to said base member; a brake member movably mounted on said base member and normally biased to a first position; second motor means mounted on said base member and including a motor element displaceable from a first position to a second position upon actuation of said second motor means, said motor element being adapted to engage said brake member and said brake member being adapted to be displaced from said first brake position to a second brake position by said motor element being displaced to said second motor element position; means on said brake member adapted to engage said platform upon said brake member being displaced to its second position; means for disabling said brake member to render said brake member ineffective to brake said platform; means for rendering said disabling means ineffective; and means for actuating said second motor means, said second motor actuating means being effective only after said disabling means have been rendered ineffective.

5. In apparatus of the class described: a base member; a second member rotatably mounted on said base member for rotation about an axis; motor means connected between said base member and said second member and adapted when actuated to rotate said members relative to one another; a lever member pivotally mounted on said base member and normally biased to a first position; solenoid means mounted on said base member and including an armature displaceable from a first position to a second position upon energization of said solenoid means, said armature having a portion adapted to engage one end of said lever member and said lever member being adapted to be displaced from said first lever position to a second position by said armature being displaced to said second armature position; means on said lever member adapted to engage said second member upon said lever member being displaced to its second position; means for locking said lever member in said first lever position; and means for disabling said locking means.

6. In apparatus of the class described: a base member; a second member rotatably mounted on said base member for rotation about an axis; means adapted to rotate said members relative to one another; a brake member movably mounted on said base member and normally biased to a first non-braking position; solenoid means mounted on said base member and including an armature displaceable from a first position to a second position upon energization of said solenoid means, said armature being adapted to engage said brake member and said brake member being adapted to be displaced from said first position to a second position by said armature being displaced to said second armature position; means on said brake member adapted to engage said second member upon said brake member being displaced to its second position; means for locking said brake member in said first position; and means for disabling said locking means.

7. In apparatus of the class described: a first member; a second member rotatably mounted on said first member for relative rotation therewith about an axis; a brake element movably mounted on one of said members and adapted to be moved to a first position or a second position; motor means mounted on one of said members and including an element displaceable from a first position to a second position upon actuation of said motor means, said motor element being adapted when displaced to engage said brake element and displace said brake element to said second brake element position; means on said brake element adapted to engage said second member upon said brake element being displaced to its second position; means for locking said brake element in said first brake element position; and means for disabling said locking means.

8. In apparatus of the class described: a base member; a second member rotatably mounted on said base member for rotation about an axis; motor means adapted when actuated to rotate said members relative to one another; a lever pivotally mounted on one of said members and normally biased to a first position; solenoid means mounted on said one of said members and including an armature displaceable from a first position to a second position upon energization of said solenoid means, said armature having a portion adapted to engage said lever and said lever being adapted to be displaced from said first lever position to a second position by said armature being displaced to said second armature position; means on said lever adapted to engage the other of said members upon said lever being displaced to its second position; means for locking said lever in said first lever position; and means for disabling said locking means.

References Cited in the file of this patent

UNITED STATES PATENTS

| | | |
|---|---|---|
| 1,421,854 | Sperry | July 4, 1922 |
| 2,722,124 | Smith | Nov. 1, 1955 |
| 2,842,967 | Borden et al. | July 15, 1958 |